United States Patent [19]
Lin et al.

[11] Patent Number: 6,157,535
[45] Date of Patent: Dec. 5, 2000

[54] COMPUTER COMPONENTS AND PERIPHERALS ASSEMBLY STRUCTURE

[75] Inventors: Chih Liang Lin; Shen Jih Chang, both of Taoyuan Hsien, Taiwan

[73] Assignee: Enlight Corporation, Taoyuan Hsien, Taiwan

[21] Appl. No.: 09/412,336

[22] Filed: Oct. 5, 1999

[51] Int. Cl.⁷ .............................. H05K 5/00; A47B 5/00; A47B 81/00

[52] U.S. Cl. ........................ 361/683; 361/683; 361/724; 361/725; 312/7.2; 312/223.2

[58] Field of Search ................................... 361/683, 724, 361/725; 312/7.2, 223.2

*Primary Examiner*—Leo P. Picard
*Assistant Examiner*—Tung Minh Bui
*Attorney, Agent, or Firm*—Dougherty & Troxell

[57] ABSTRACT

A structure of building-block type members for assembly of computer components permitting spatial variation, within, blocks in pillar and tube of same length and equally spaced are butted to a monitor and the main unit with the circumference of the tube in diameter not greater than the spacing between any two abutted pillars of surrounding four pillars; said tubes are provided on the back panel of the monitor, and pillars, on the sides of the main unit combine the monitor and main unit allowing optimal space use for combination as desired and the additional of peripherals.

7 Claims, 6 Drawing Sheets

FIG.2

COMPUTER COMPONENTS AND PERIPHERALS ASSEMBLY STRUCTURE

BACKGROUND OF THE INVENTION

1. Field of the Invention

The present invention relates to a structure for assembling computer components and peripherals, and more particularly, to a structure utilizing building-block type of assembly allowing change and manipulation of the space of arrangement as desired. Building-block type of assembly members also permits the addition of peripherals by utilizing pillars and tubes to fully explore the fun of computer.

2. Description of the Prior Art

A PC is usually comprised of a main unit a monitor, a keyboard, a mouse, and a set of speaker, and these key accessories consume a lot of desk space making it difficult to maintain a neat and clean arrangement.

SUMMARY OF THE INVENTION

The primary objective of the present invention is to provide a structure of DIY assembly for the computer and its peripherals by butting building-block members comprised of a multiple of pillar and tube members in same length and equally spaced in each block. The circumference of each tube is roughly equal to the sum of spacing among its surrounding our pillars so that when butted to the pillar block, the body of the tube is just caulked into the spacing of the pillars.

Another objective of the present invention is to provide combination means of the optimal use of space for butting a monitor and a main unit with tubes on the backboard of the monitor and pillars on the sides of the main unit that also permits connection to the peripherals as desired by the user.

Another objective yet of the present invention is to achieve a consistent appearance of the PC set by having the push buttons on the monitor, knobs and power SW on sideboards on the casing of the main unit, and the face panel and indicators of the CD ROM made in the shape of a pillar.

Another object yet of the present invention is to provide a turning axle at where the sideboard of the main unit is connected to its casing. Both sides of said casing are respectively provided with a sideboard knob and two reeds to allow wider opening angle for the sideboard by disengaging from the sideboard knob for easy assembly maintenance of the parts inside the main unit.

DETAILED DESCRIPTION OF THE INVENTION

Figure 2:
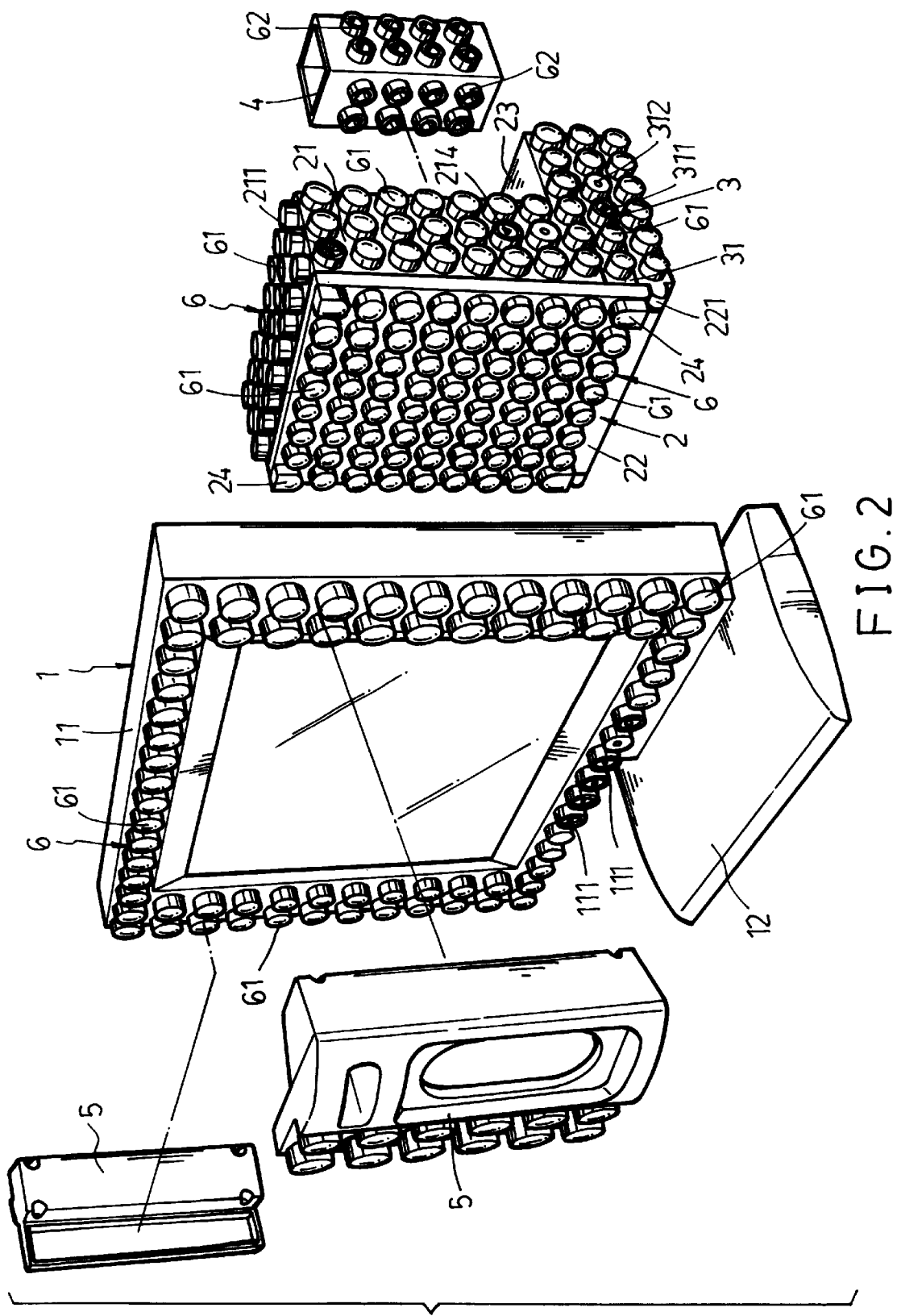
FIG. 2 is a blowout view of the present invention.
Figure 3:
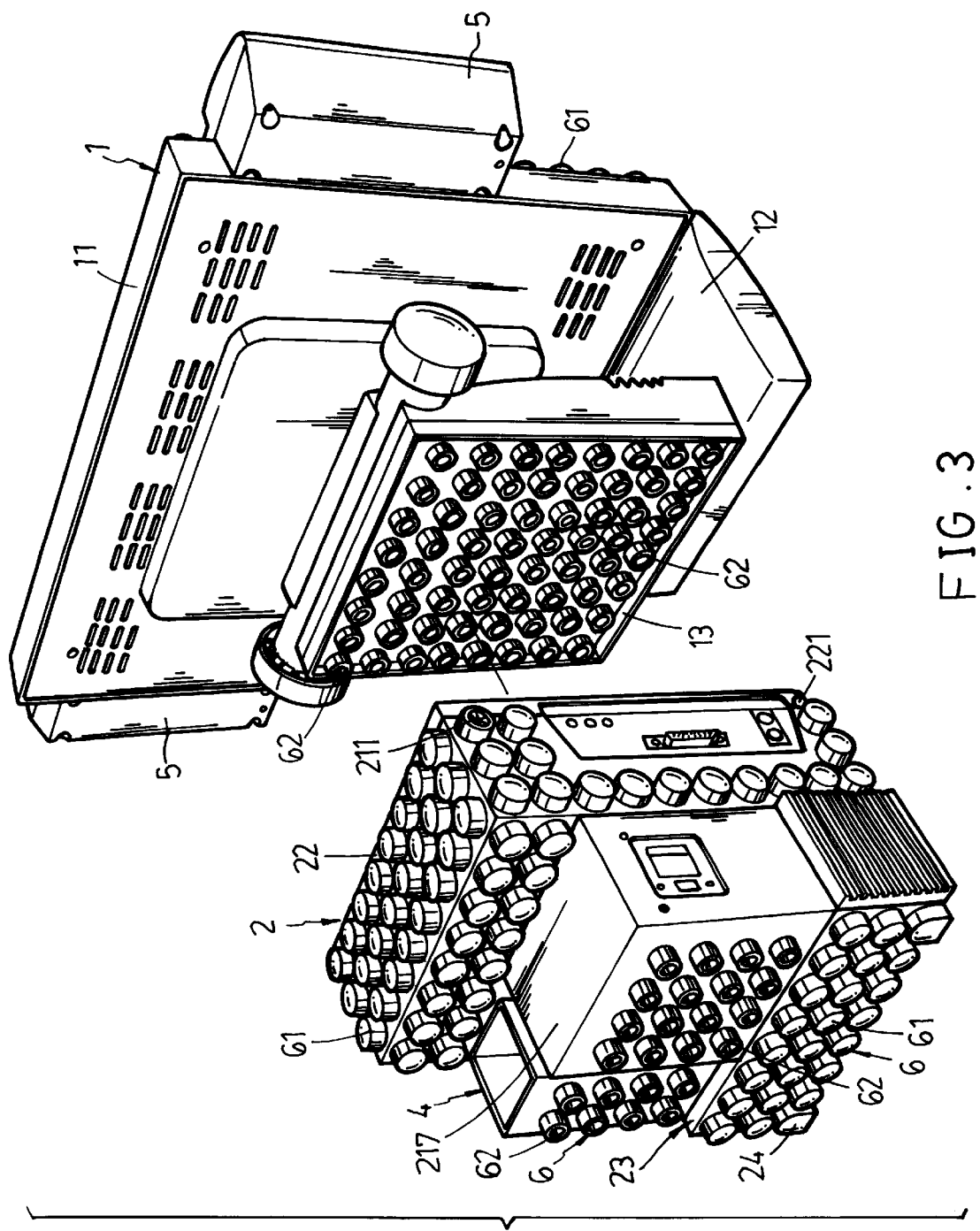
FIG. 3 is another blowout view of the present invention.
Figure 4:
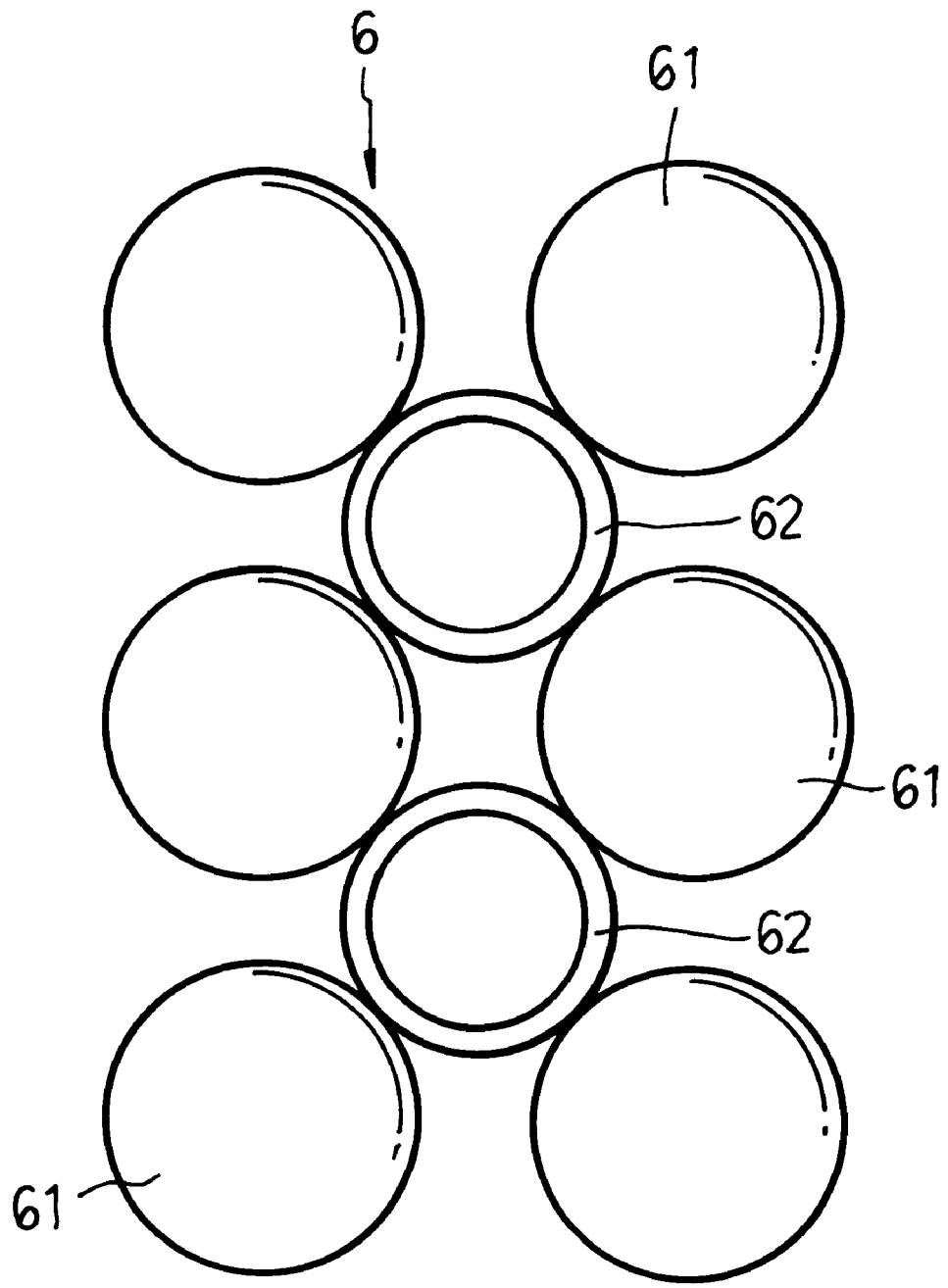
FIG. 4 is a view showing the butted building-block type of pillars and tubes of the present invention.

Referring to FIGS. 1 through 4, block units 6 of the present invention are provided to a monitor 1, a main unit 2, a CD-ROM 3 and a set of speaker 5. As illustrated in FIG. 4, said block unit 6 is divided into pillar member 61 and tube member 62. Within, all pillar members 61 are of the same length and equally spaced, and all tube members 62, also equally spaced are also of the same length as that of the pillar, and the circumference of each tube is roughly equal to the sum of the accommodation space permitted by and among four pillars 61 so that any two given objects provided with the block unit of pillar member 61 or tube member 62 can be butted together.

Figure 1:
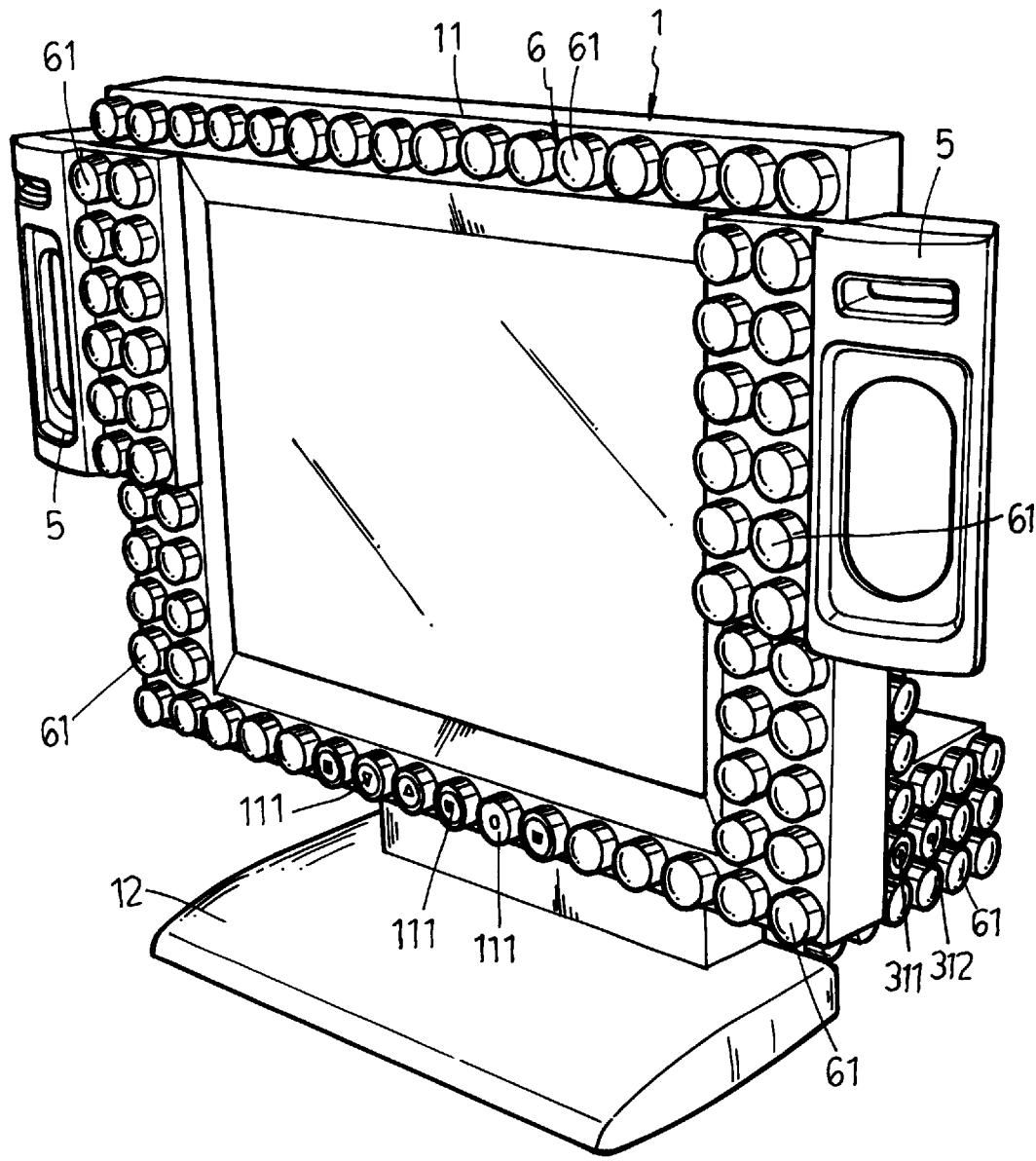
FIG. 1 is a view showing the appearance of the present invention.

Now referring to FIGS. 1 through 3. A panel 11 and a base 12 are provided to a monitor 1 of the present invention. Within, said pillar member 61 of the block unit 6 is provided on the panel 11 and a multiple push buttons 111 each following the shape of a pillar are provided on the lower edge of the panel 11. A set of speaker 5 can be assembled to both sides of the panel 11 as desired and the pillar member 62 of the block unit 6 is provided on the outer side of a supporting backboard 13 to the base 12 for connection to the main unit 2 or to a keyboard (not illustrated) or other computer peripherals.

Figure 5:
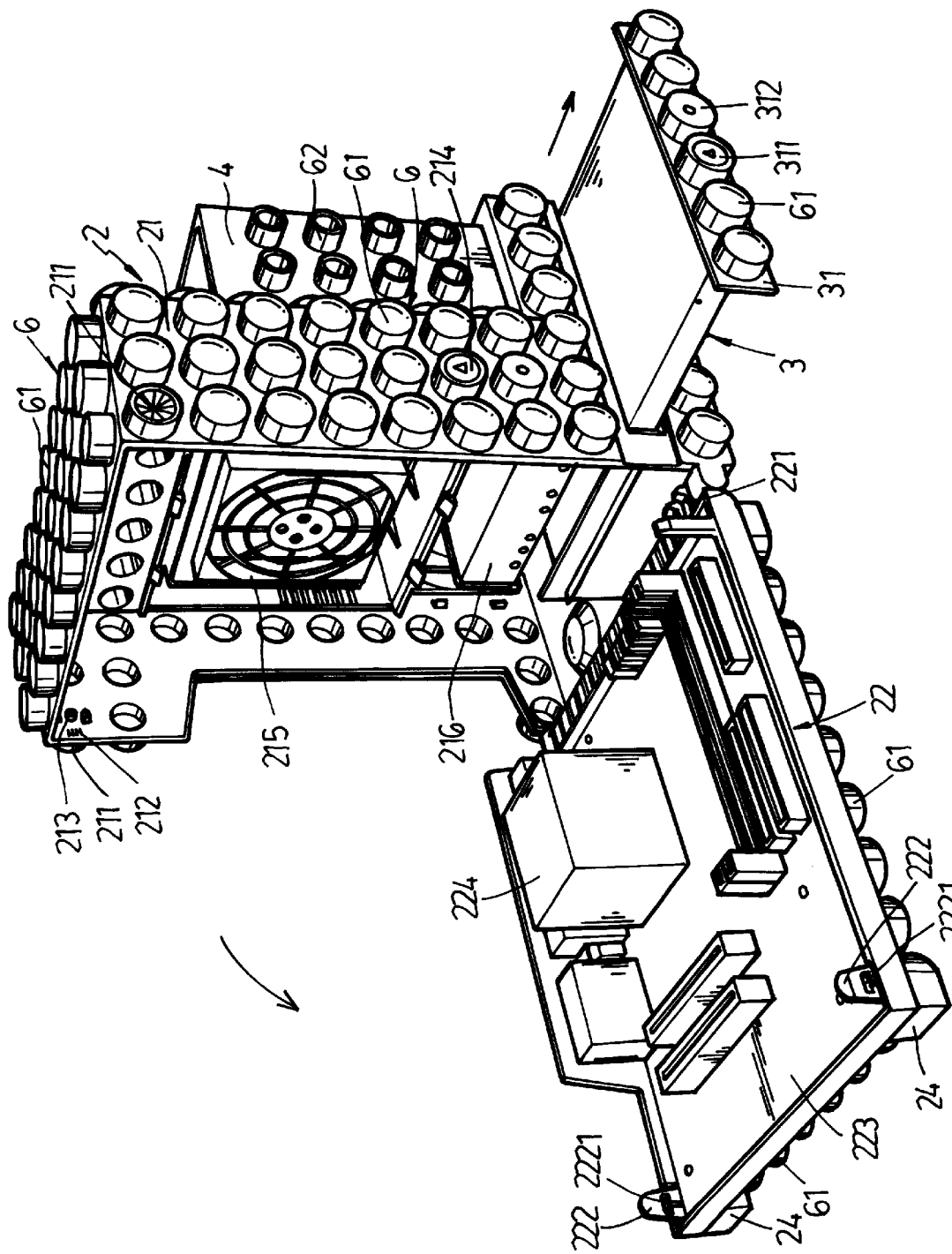
FIG. 5 is a view showing the opening between the casing of the main unit and its side board of the present invention.

As illustrated in FIGS. 3 and 5, the main unit 2 is comprised of a casing 21 and a sideboard 22. Within said side panel 22 is provided at the inner side of the open to the casting 21. A block unit is provided on the outer side of the sideboard 22, and a main unit board 223 and a central processor 224 are accommodated on the inner side, a fan 215, the CD-ROM 3, a hard disk 216 and a power supply 217 are received inside the casing 21. Said power supply 217 is located at where protruding outside the casing 21 and leaning to one side so to expose a plug. A space 23 is reserved on the other side. Each side of the casing 21 is provided with a pillar member 61 to allow the main unit 2 butt with its inside pillar 61 to the backboard 13 of the monitor, thus conceal the main unit 2 behind the monitor 1. A sink is provided on the front of casing 21 of the main unit 2 to accommodate the CD-ROM. The panel 31 of the CD 3 is provided with a multiple of pillar members to receive a switch 311 and an indicator 312. A power switch 214 and its indicator are provided above the CD-ROM 3 on the front of the casing 21. The reserved space 23 receives a penholder 4, which is provided with a pillar member 62 for optimal use of the space.

Figure 6:
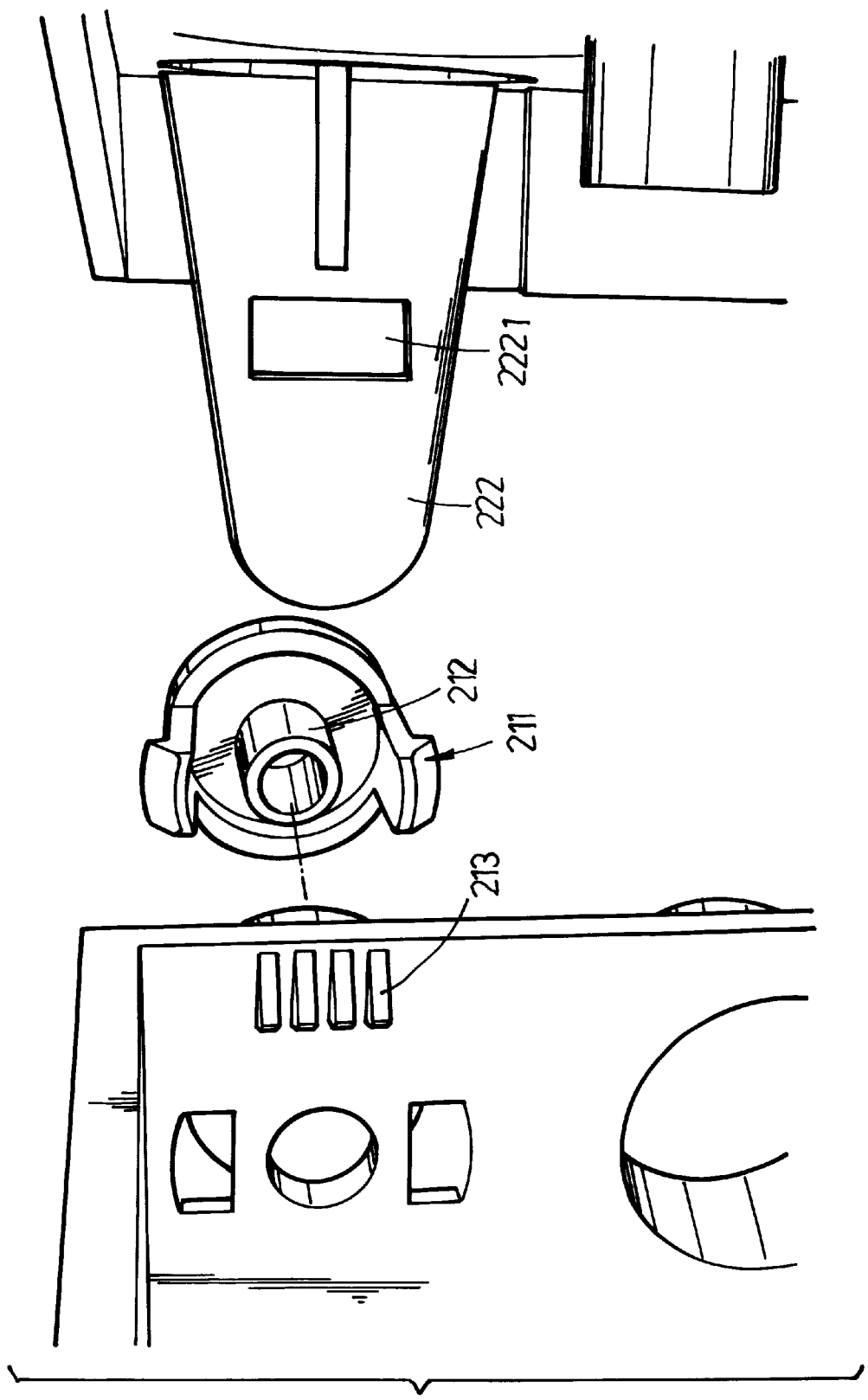
FIG. 6 is a view showing the locality of a sideboard knob on the casing and sideboard reed to the main unit of the present invention.

As illustrated in FIGS. 5 and 6, sideboard a knob 211 and a tongue 212 are provided on both upper sides to the open of the casing 21, and a reed 222 is each provided in both sides to the sideboard 22 closing on sideboards to the casing 21 at where corresponding to the knob 211. Once the sideboard 22 rotated by way of turning axle 221 to snap on the casing 21, a buckling hole 2221 provided below said reed 222 caulks into the tongue 212 to secure the sideboard 22 onto the casing 21. To open said sideboard 22, the knob 211 is pressed to allow a post 213 protruding inward to press the reed inside, so that the buckling hole 2221 is disengaged from the tongue. Then the sideboard 22 is opened up to a greater angle (not less than 180 degrees) to facilitate replacement or assembly of internal parts.

Furthermore, a footage 24 may be capped into each corner of the pillar member 61 to the sideboard 22 to slightly raise the side of the sideboard 22 that contacts the desk to prevent the pillar 61 from being scratched due to friction.

We claim:

1. A structure of building block type units for computer assembly allowing various spatial arrangements by butting said block units respectively comprised of pillar and tube members all of the same length and equally spaced in each block unit with the circumference of the tube member roughly equal to the sum of the spacing among four pillar members; a monitor, provided with a multiple of pillar members on the front panel of its four sides, and a multiple of tube members are provided on the outer side of the supporting back board connected to the base; a main unit including a casing provided with a multiple of pillar and tube members, and a side board provided on its outer side a multiple of pillar members; both of the monitor and the main unit are butted together with said tube members on the back board of the former and the pillar members on the side board of the latter for assembly and connection to peripherals as desired for space saving.

2. A structure of building block type units for computer assembly allowing various spatial arrangements as claimed in claim 1, within, a turning axle is provided at where below the connection of the side board to the casing of the main unit, side board knobs are provided at both upper sides of the casing and two reeds are provided in the upper side of the sideboard to allow a wider opening by disengaging said knob from the reed to facilitate assembly and service.

3. A structure of building block type units for computer assembly allowing various spatial arrangements as claimed in claim 1, within, a multiple pillar members are provided on the panel of a CD-ROM, and a switch and an indicator are provided in said members.

4. A structure of building block type units for computer assembly allowing various spatial arrangements as claimed in claim 3, within, press button of the monitor, side knob and power SW on the casing of the main unit and switch and its indicator on the CD-ROM are all made in the shape after the pillar member for achieving a consistent appearance.

5. A structure of building block type units for computer assembly allowing various spatial arrangements as claimed in claim 1, within, press button of the monitor, side knob and power SW on the casing of the main unit and switch and its indicator on the CD-ROM are all made in the shape after the pillar member for achieving a consistent appearance.

6. A structure of building block type units for computer assembly allowing various spatial arrangements as claimed in claim 1, within, a space is reserved on the side of the main unit to provide the butting the tube members of a penholder to the pillar members on the casing.

7. A structure of building block type units for computer assembly allowing various spatial arrangements as claimed in claim 1, within, the panel of the monitor allows butt to a set of speaker.

* * * * *